United States Patent
Krüger et al.

(10) Patent No.: US 7,929,128 B2
(45) Date of Patent: Apr. 19, 2011

(54) APPARATUS FOR THE OPTICAL INSPECTION OF THE THERMAL PROTECTION TILES OF A SPACE SHUTTLE

(75) Inventors: Ursus Krüger, Berlin (DE); Oliver Stier, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 12/238,466

(22) Filed: Sep. 26, 2008

(65) Prior Publication Data

US 2010/0079974 A1    Apr. 1, 2010

(51) Int. Cl.
*G01N 21/00* (2006.01)
(52) U.S. Cl. ................................... 356/237.2
(58) Field of Classification Search .... 356/237.1–241.6, 356/242.1–243.8, 426–431, 600–640
See application file for complete search history.

(56) References Cited

U.S. PATENT DOCUMENTS

| | | | | |
|---|---|---|---|---|
| 3,997,268 A | * | 12/1976 | Fladda et al. | 356/632 |
| 4,018,531 A | * | 4/1977 | Leendertz | 356/512 |
| 4,738,137 A | | 4/1988 | Sugg et al. | |
| 4,836,470 A | * | 6/1989 | Criswell | 244/2 |
| 5,506,644 A | * | 4/1996 | Suzuki et al. | 396/319 |
| 5,841,502 A | * | 11/1998 | Miwa | 351/209 |
| 6,118,540 A | * | 9/2000 | Roy et al. | 356/394 |

OTHER PUBLICATIONS

Canadian Space Agency on Canadarm and Canadarm2: http://www.asc-csa.gc.ca/eng/iss/canadarm2/default.asp.*

* cited by examiner

*Primary Examiner* — Gregory J Toatley
*Assistant Examiner* — Jarreas C Underwood
(74) *Attorney, Agent, or Firm* — Young & Thompson

(57) ABSTRACT

An apparatus for the inspection of the heat shield of a space shuttle has a drive so that it can automatically undertake an examination of the tiles of the heat shield. The apparatus moves over the surface with the aid of the drive, and images of the region to be inspected are produced with the aid of a camera. For these images, the tiles are illuminated subsequently by light sources from different directions, as a result of which the tiles can be reliably evaluated with regard to possible defects.

12 Claims, 4 Drawing Sheets

Figure 1:
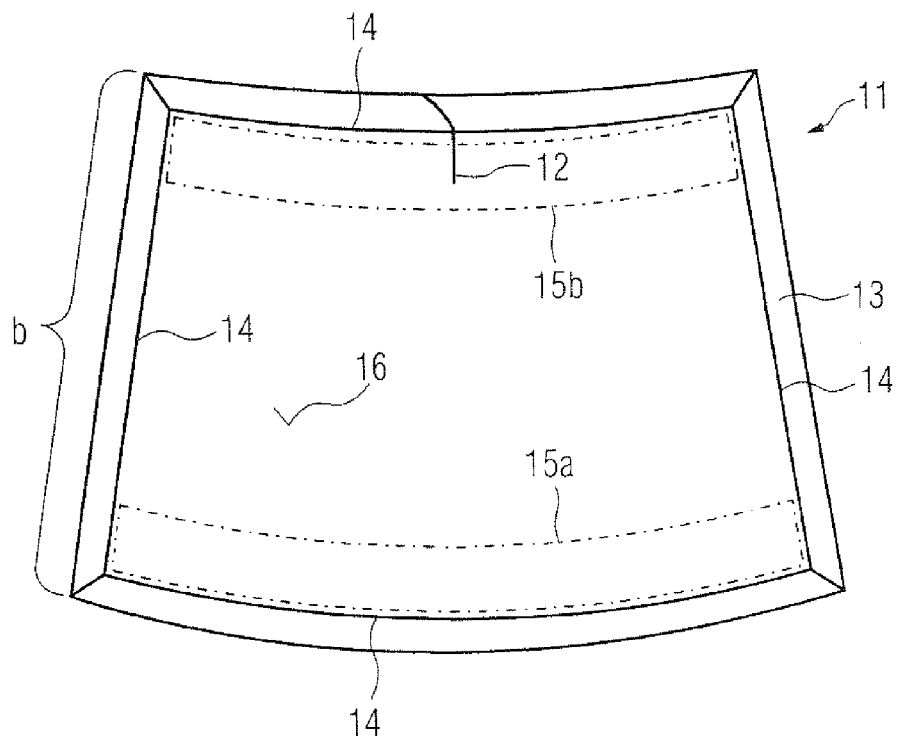

APPARATUS FOR THE OPTICAL INSPECTION OF THE THERMAL PROTECTION TILES OF A SPACE SHUTTLE

BACKGROUND OF THE INVENTION

The invention relates to an apparatus with the aid of which the thermal protection tiles on the surface of a space shuttle can be examined.

FIELD OF THE INVENTION

Such an apparatus is already known, for example from U.S. Pat. No. 4,738,137 (Sugg). Sugg describes an acoustic emission nondestructive testing for the purpose of inspecting the thermal protection tiles. This is carried out by virtue of the fact that a narrowband acoustic emission signal from the tiles is evaluated to the effect that discontinuities in the tiles are detected.

DESCRIPTION OF THE RELATED ART

Experience in the use of the space shuttle has shown that defects in the thermal protection tiles of space shuttles can, in particular, have serious consequences on the return flight to Earth if said defects have occurred during use. For example, the thermal protection tiles can be damaged during the launch of the space shuttle. Whereas before the launch of a space shuttle it is possible from the Earth to use said method to conduct a thorough inspection of the heat shield of the space shuttle, damage to the space shuttle when in space can be detected only with a high expense by a space walk by members of the crew. This is also mandatory since, on the return flight to Earth, high temperatures occurring after entry into the Earth's atmosphere can lead, even in the case of relatively small scale damage to the heat shield of the space shuttle, to a total loss of the latter, including death of the crew.

There is thus a need to render possible an effective and reliable option for inspecting the heat shield of a space shuttle during use in space.

SUMMARY OF THE INVENTION

The problem is solved according to the invention by equipping an apparatus for the optical inspection of thermal protection tiles of the surface of a space shuttle in the following way. A support frame bears a camera and at least two light sources. The light sources and the camera are aligned toward said surface so that the region of the surface that is to be inspected can, on the one hand, be illuminated from different directions, while, on the other hand, the camera can be used to take images of the illuminated region. It is provided according to the invention that the light sources can be activated independently of one another such that it is possible to illuminate the region to be inspected from different directions. However, said support frame has an actuator that enables the apparatus to move automatically at a specific distance over said surface. This has the advantage that the apparatus can be used without a space walk by the crew. A greater measure of safety for the crew is thereby achieved. Additionally, the crew is relieved of a task, in particular in the event of carrying out the inspection method automatically, and can thus concentrate more effectively on the main tasks of the space flight.

The apparatus can sweep over the heat shield of the space shuttle in a specific programmed pattern such that a complete inspection of the heat shield is possible in the final analysis. The angle of the isolation can be taken into account in this case, the apparatus inspecting parts of the heat shield of the space shuttle that are located on the shadow side. It is thereby possible to prevent the isolation from falsifying the measurement result, which is intended to be determined by illumination of the various light sources.

A further design of the invention is obtained when said actuator includes a nozzle drive. The latter serves the purpose of traversing on the space shuttle in space a movement pattern that is independent of the space shuttle. In this process, the path covered is controlled by the nozzle drive. In order to simplify the control, it can advantageously be provided that said support frame has spacers which define the required distance between the camera and said surface to be inspected. This means that the nozzle drive can be used to move the apparatus up to the surface to be inspected until the apparatus is mounted with the spacers on the surface. Subsequently, the images of the relevant surface section can be made. Thereafter, the apparatus is put down on the next section of said surface that is to be inspected.

As an alternative to this, it can also advantageously be provided that said support frame has rollers. The latter are suitable for enabling a movement of the apparatus on said surface of the space shuttle. This movement can be undertaken by a nozzle drive in a way already described. As an alternative, it is also possible to drive the rollers such that the apparatus can move on said surface.

It is also advantageous in the case of driven rollers when said support frame has a nozzle drive that generates a drive force in the direction of the surface to be inspected. It is thereby ensured during weightlessness that the rollers are pressed against the surface of the heat shield and follow the contour of the space shuttle.

A further refinement of the invention is obtained when said support frame has a screen with the aid of which a section of said surface that is to be inspected can be screened from the sunlight. This means that the screen is aligned in the sunlight in such a way that its cast shadow falls onto the surface to be inspected. It is thereby advantageously possible to achieve that an optical inspection of a surface section can be carried out even on the sun side of the space shuttle without the sunlight having an influence. Consequently, the apparatus is independent of the position of the space shuttle relative to the sun. It can advantageously be provided that the screen is fitted movably on said support frame such that said screen can be brought into a suitable position for shading the surface to be inspected.

A special embodiment of the invention provides that all light sources emit light of the same spectrum. These are used to carry out sequentially an illumination of the surface to be inspected, the evaluation of the set of images generated thereby being simplified. Alternatively, light in various spectra can also be emitted from one direction in each case, and this enables the simultaneous illumination of the section, to be inspected, of said surface from all directions. In this variant, distinguishing spectra enables the directions to be distinguished. It is thereby advantageously possible to inspect the relevant section particularly quickly.

An illumination of the section, to be inspected, of said surface can be performed, for example, from four different directions, the support frame having exactly four light sources in this case. It is therefore possible to illuminate the surface with two oppositely situated light sources in each case, it thereby being possible, in particular, for structures such as cracks to be particularly clearly distinguished from other anomalies of the surface in the subsequent evaluation method.

BRIEF DESCRIPTION OF THE DRAWING FIGURES

Further details of the invention may be seen from the drawing. Identical or corresponding elements of the drawing are respectively provided with identical reference symbols, and are repeatedly explained only to the extent by which the figures differ.

Figure 2:
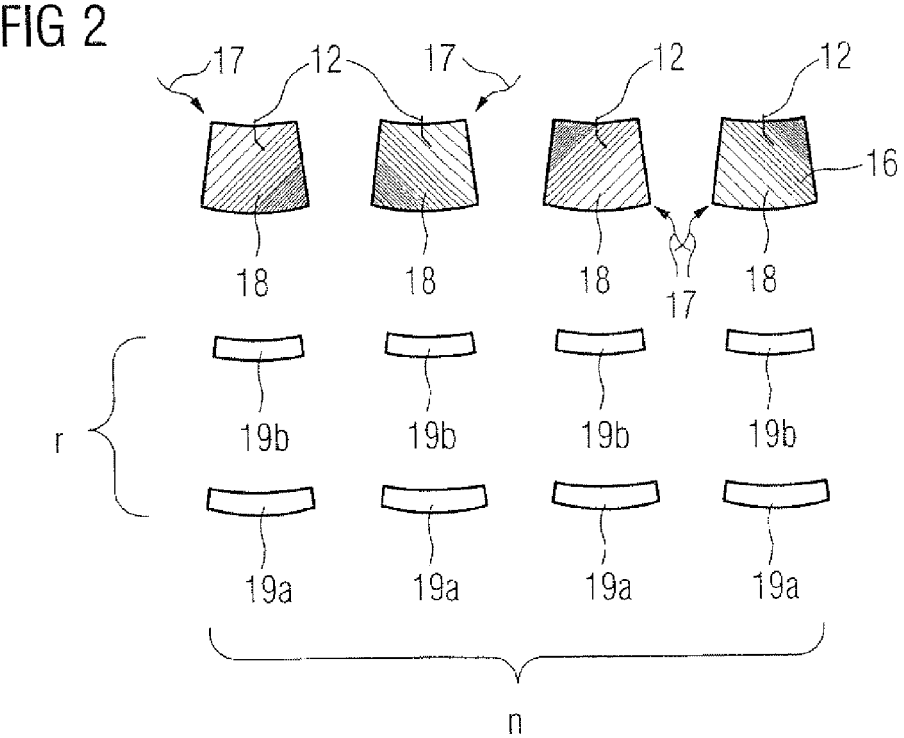
Figure 3:
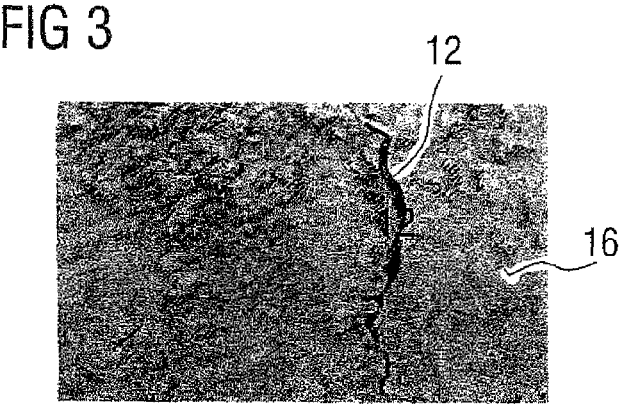
Figure 4:
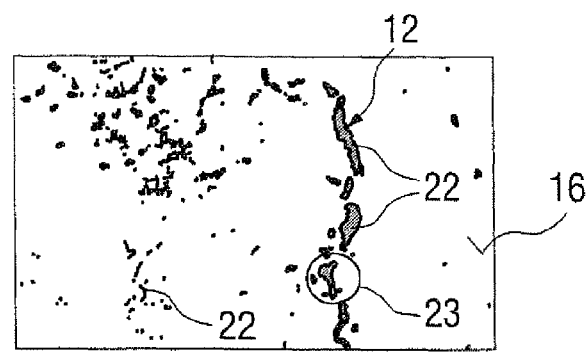
Figure 5:
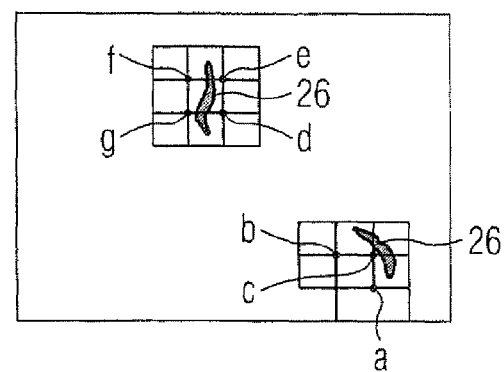
Figure 6:
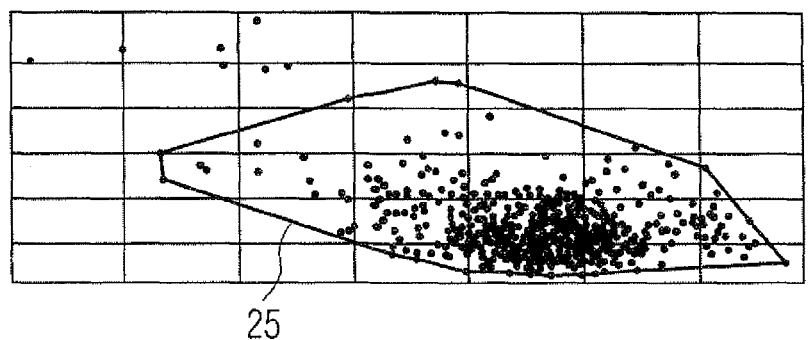
Figure 7:
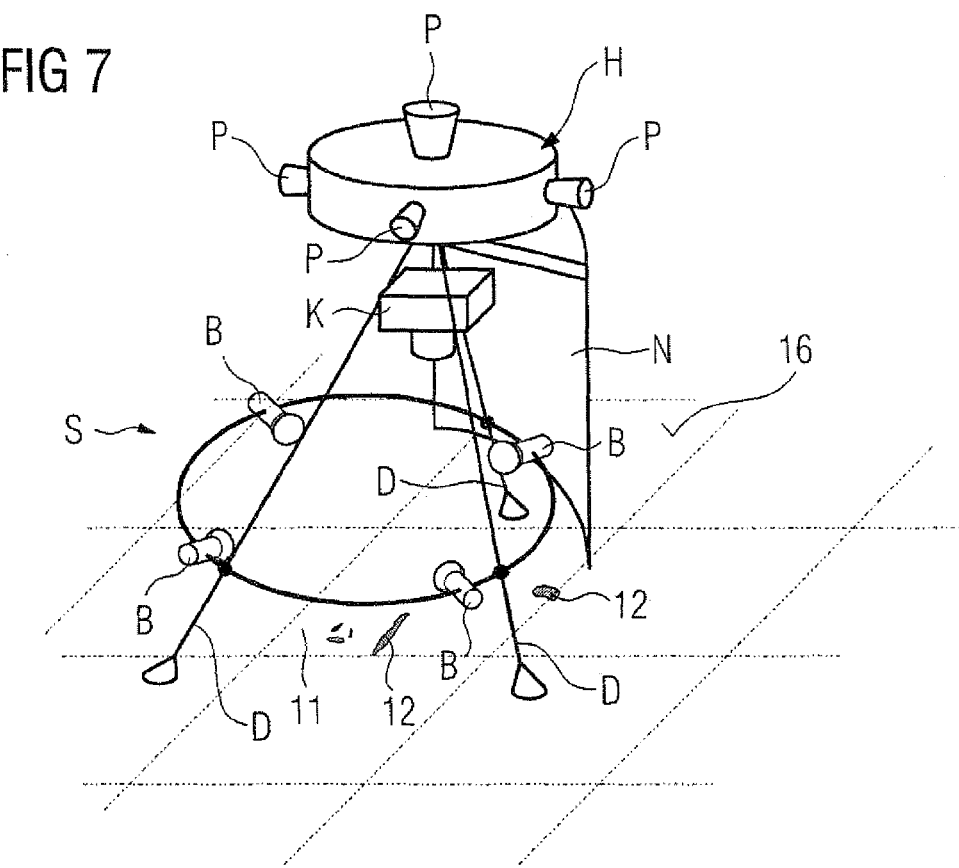
Figure 8:
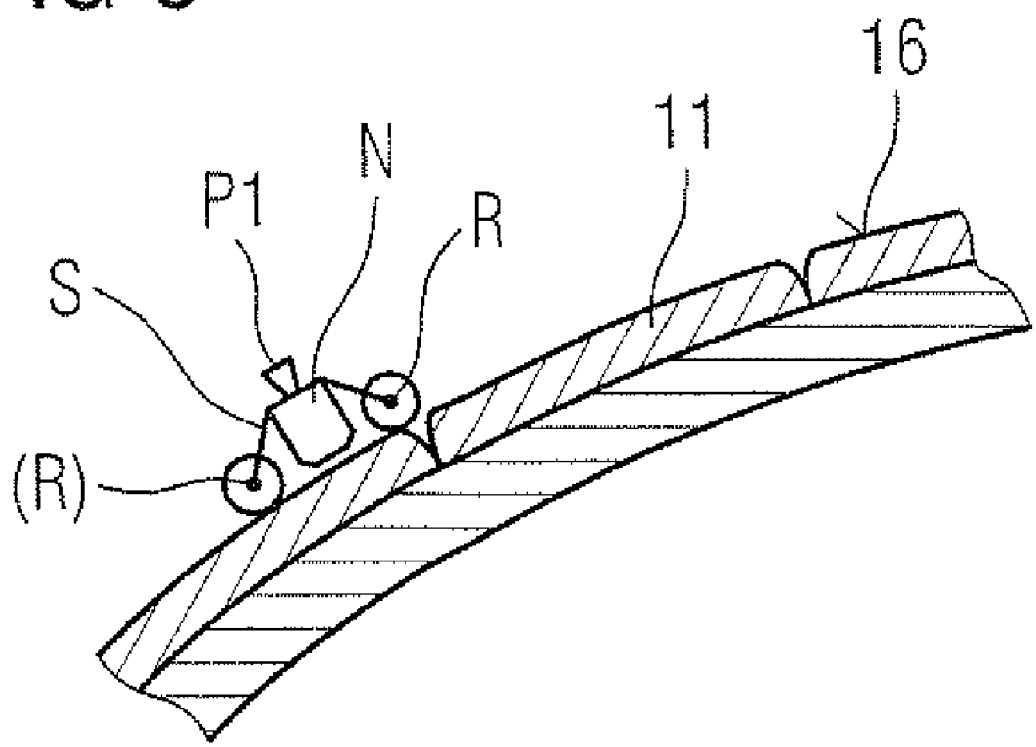

FIG. 1 shows a plan view of a wall tile from a space shuttle as object to be inspected, FIG. 2 shows n images of the wall tile from FIG. 1 and n×r sub-images of the r regions of interest indicated in FIG. 1, FIGS. 3 and 4 present one example of a sub-image of the wall tile from FIG. 1 before and after respectively, the creation of a binary image by thresholding, FIGS. 5 and 6 present an alternative procedure for the detection of cracks by defining chips, whereby FIG. 6 represents the data matrix of the chips, FIG. 7 shows a first exemplary embodiment of the inventive apparatus with a nozzle drive, and FIG. 8 shows a further exemplary embodiment of the inventive apparatus with rollers and a nozzle drive.

DETAILED DESCRIPTION OF THE INVENTION

The optical inspection of the thermal protection tiles can be done in such a kind that texture anomalies like cracks are found by performing at least the following main steps. In a first main step more than one (n>1) digital images of the surface are created by an image sensor whereby the surface is illuminated from different directions for each image to be created. In a second main step at least one (for example the whole area of the tile), or more than one (for example the areas near the edge of the tiles), (r>0) regions of interest of the surface are defined whereby all regions of interest are entirely shown in all of the n images. Subsequently a matrix of n×r sub-images is created which consists of the regions of interest in each of the n images. In a third main step texture anomalies are detected in the sub-images by digital image processing, and an abnormality chart showing the putative anomalies is generated for each sub-image. In a fourth main step for each of the regions of interest a joint abnormality chart is generated by fusion of all abnormality charts of that region of interest. In a fifth main step texture anomalies are detected in each of the joint abnormality charts.

The advantage of the this method is that the inspection of matt surfaces of the tiles having a random texture can be performed with a high reliability. This reliability can be achieved by the inventive combination of the said main steps whereby the principal idea is the creation of a plurality of sub-images of one and the same region of interest, the sub-images differing by the illumination angle. These sub-images are interpreted separately by digital image processing to find putative texture anomalies. In this way abnormality charts of the texture anomalies can be generated which can be fused to a joint abnormality chart afterwards. In the joint abnormality chart the number of putative texture anomalies is reduced advantageously so that the detection rate for true texture anomalies like cracks can be enhanced to a percentage close to 100% at a very small false alarm rate.

A wall tile 11 is shown in FIG. 1. As a matter of experience in the visual inspection of such wall tiles, cracks in the surface 16 are very hard to find if the illumination is not optimal. In the wall tile 11 for example a crack 12 shall be found by the inventive method of inspection. For that purpose according to the inventive method a number of images are taken of the surface 16 under different illumination angles (i.e. from each corner of the wall tile 11). These images will, at first, be analyzed individually in the following steps of the inventive method.

In the chosen example (FIG. 2) of the wall tile 11 only cracks are interesting texture anomalies to be found. Furthermore, the cracks are supposed to extend from the tile boundary to its inner region. Therefore the regions of interest 15a, 15b are defined. The width of the defined regions of interest 15a, 15b is ⅙ of their length since it is presumed that mechanically relevant cracks have a minimal length in the order of magnitude of this width.

FIGS. 3 and 4 show the effect of a creation of binary images by thresholding of the sub-images. The submitted sub-image is shown in FIG. 3. This is an original photograph. This sub-image is decomposed by the 1%-quantile of the gray level, yielding the binary image shown in FIG. 4. The quantile was chosen as a threshold, and all pixels with brightness values below the threshold were selected. These were called foreground pixels, and all pixels not selected were called background pixels.

In the next step a grouping of the foreground pixels into blobs can be done. The blobs have to be evaluated to form or not to form a crack. FIGS. 5 and 6 present a known procedure for the detection of cracks by defining chips, whereby FIG. 5 represents schematically an abnormality chart of outlier chips supposed to indicate a crack and FIG. 6 represents the data matrix of the chips. The following steps have to be performed:
1. Tiling of a sub-image into partially overlapping chips (or tiles)
2. Calculation of chip properties relevant for their classification
3. Data matrix of the chips
4. Detection of outliers (supplementary data points)
5. Assignment of abnormal chips to outliers
6. Abnormality chart displaying putative anomalies FIG. 7 shows an example of an apparatus for the inspection of the wall tile 11 to find cracks 12 in a schematic perspective view. The apparatus comprises a support frame realized as a tripod. The support frame S can be positioned above the wall tile 11. On the support frame S a digital camera K and four light sources B are fixed in a position such that they are oriented towards the wall tile 11 to be inspected. The method is controlled by a computer, which has a signal connection to the digital camera K. The light sources B can be driven separately, so that the wall tile 11 can be illuminated from four different directions and each of these illumination conditions can be documented by the digital camera K.

The spacers D of the support frame S serve the purpose of mounting the support frame S securely on the surface 16 that is formed by the outer skin of the space shuttle (not illustrated in more detail). The tile 11 can therefore be inspected at a defined distance by the camera K. Once the inspection of the tile 11 has been concluded, the apparatus can be moved further onto the neighboring tile. To this end, there is fitted on the support frame S a nozzle head H that has a number of nozzle drives P. These nozzle drives P permit a movement of the apparatus in all spatial directions, there being provided a nozzle that points away from the surface 16 and enables the support frame S to exert a pressure force against the surface 16. The remaining nozzle drives P permit a movement of the support frame S parallel to the surface 16. Not shown in FIG. 7, there could be a sixth nozzle, which points to the surface 16 and helps the support frame S to start from the surface after inspection of a certain wall tile.

Furthermore, there is fitted on the outer circumference of the apparatus a screen N that can be rotated about the axis of symmetry of the apparatus. Said screen can be aligned with respect to the sun such that the tile 11 to be inspected lies in shadow, and so the result of inspection, which is produced by the four light sources B, is not falsified by the sunlight.

In accordance with FIG. 8, the apparatus has on the support frame S rollers R with the aid of which the apparatus can move over the surface 16 of the thermal protection tiles 11. A drive of the rollers not represented in more detail) is provided for this purpose. Furthermore, the support frame S carries a nozzle drive P1 that produces by means of its alignment a pressure force of the apparatus on the surface 16. The camera and the light sources are not visible in FIG. 8, because they are fitted in the interior of a box that comes into use as screen N. This box ensures an effective screening of the region to be inspected from the sun and is open toward the surface 16. An alignment of the screen N in accordance with FIG. 8 is therefore not required.

The invention claimed is:

1. An apparatus for optical inspection of thermal protection tiles (11) of a surface (16) of a space shuttle comprising a support frame (S) which bears a camera (K) and at least two light sources (B), the light sources (B) and the camera (K) being oriented towards the intended place of said surface (16), whereby the light sources (B) can be driven separately by a controller (C), said support frame (S) has an actuator, which is able to move said camera (K) in a certain distance towards said surface (F) of the space shuttle, wherein said actuator comprises a jet propulsion (P) which independently moves the frame in a space around the space shuttle.

2. The apparatus as claimed in claim 1, wherein said support frame (S) comprises a spacer (D) which defines said certain distance between said camera (K) and said surface (F).

3. An apparatus for optical inspection of thermal protection tiles (11) of a surface (16) of a space shuttle comprising a support frame (S) which bears a camera (K) and at least two light sources (B), the light sources (B) and the camera (K) being oriented towards the intended place of said surface (16), whereby the light sources (B) can be driven separately by a controller (C), said support frame (S) has an actuator, which is able to move said camera (K) in a certain distance towards said surface (F) of the space shuttle, wherein said support frame (S) comprises rolls (R) which move the apparatus along said surface of the space shuttle.

4. The apparatus as claimed in claim 2, wherein said support frame (S) comprises a jet propulsion (P1) which generates a propulsive force normal towards of the surface.

5. The apparatus as claimed in claim 1, wherein said support frame (S) comprises a screen (N) for the purpose of shadowing a region of said surface to be inspected from the sun light.

6. The apparatus as claimed in claim 1, wherein the light sources emit light of the same wavelength.

7. The apparatus as claimed in claim 1, wherein the support frame (S) bears exactly four light sources (B).

8. The apparatus as claimed in claim 4, wherein the support frame (S) bears exactly four light sources (B).

9. The apparatus as claimed in claim 3, wherein said support frame (S) comprises a spacer (D) which defines said certain distance between said camera (K) and said surface (F).

10. The apparatus as claimed in claim 9, wherein said support frame (S) comprises a jet propulsion (P1) which generates a propulsive force normal towards of the surface.

11. The apparatus as claimed in claim 3, wherein said support frame (S) comprises a screen (N) for the purpose of shadowing a region of said surface to be inspected from the sun light.

12. The apparatus as claimed in claim 3, wherein the light sources emit light of the same wavelength.

* * * * *